US009268172B2

(12) United States Patent
Wang et al.

(10) Patent No.: US 9,268,172 B2
(45) Date of Patent: Feb. 23, 2016

(54) POSITIONING DEVICE FOR POSITIONING AN OPTICAL FILM SET, BACKLIGHT MODULE, AND LIQUID CRYSTAL DISPLAY

(71) Applicant: Shenzhen China Star Optoelectronics Technology Co., Ltd., Shenzhen, Guangdong (CN)

(72) Inventors: Jiaqiang Wang, Shenzhen (CN); Shihhsiang Chen, Shenzhen (CN); Gang Yu, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 261 days.

(21) Appl. No.: 13/643,110

(22) PCT Filed: Sep. 28, 2012

(86) PCT No.: PCT/CN2012/082333
§ 371 (c)(1),
(2) Date: Oct. 24, 2012

(87) PCT Pub. No.: WO2014/043944
PCT Pub. Date: Mar. 27, 2014

(65) Prior Publication Data
US 2014/0078441 A1    Mar. 20, 2014

(30) Foreign Application Priority Data
Sep. 18, 2012    (CN) .......................... 2012 1 0345843

(51) Int. Cl.
*G02F 1/1333*    (2006.01)
*G06F 1/16*    (2006.01)
(Continued)

(52) U.S. Cl.
CPC ............ *G02F 1/1336* (2013.01); *G02B 6/0088* (2013.01); *G02F 1/1303* (2013.01);
(Continued)

(58) Field of Classification Search
CPC .................... G02F 1/133308; G02F 1/133608; G02F 2001/133314; G02F 2001/133317; G02F 2201/465; G02F 2001/133322; G02F 2001/133308; G02B 6/0088; G02B 6/0086; G06F 1/1637; G06F 1/1601; G06F 1/1607; G06F 1/1609; Y10S 345/905
USPC ............. 349/58, 60; 362/632, 633, 634, 97.1, 362/97.2, 97.4; 345/905; 361/679.01, 361/679.26, 679.3, 679.55, 679.56, 361/724–727, 829; 348/787, 789, 794, 836, 348/843
See application file for complete search history.

(56) References Cited

U.S. PATENT DOCUMENTS 7,244,966 B2 *   7/2007   Fukayama ........ G02F 1/133308
                                                 257/98
7,940,287 B2 *   5/2011   Kim et al. ...................... 349/60
(Continued)

*Primary Examiner* — Michael Caley
*Assistant Examiner* — Angela Davison
(74) *Attorney, Agent, or Firm* — Andrew C. Cheng

(57) ABSTRACT

A positioning device which positions an optical film set in a backlight module is proposed. The backlight module includes a back plate. The optical film set is disposed on the back plate. The positioning device includes an assembly sheet and a fixing device. The assembly sheet is disposed at one end of the positioning device for penetrating an opening formed on at least one edge of the optical film set. The fixing device is used for fixing the positioning device to a side plate of the back plate. A backlight module in which the positioning device is used and a liquid crystal display (LCD) in which the positioning device is used are proposed as well. Owing to the present invention, the positioning of each optical film in the optical film set is simple. Also, an LCD featuring a thin bezel design is implemented.

6 Claims, 5 Drawing Sheets

(51) Int. Cl.
   *F21V 8/00* (2006.01)
   *G02F 1/1335* (2006.01)
   *G02F 1/13* (2006.01)

(52) U.S. Cl.
   CPC .... *G02F1/133308* (2013.01); *G02F 1/133615* (2013.01); *G02F 2001/133314* (2013.01); *G02F 2001/133317* (2013.01); *G02F 2001/133322* (2013.01); *G02F 2201/46* (2013.01); *G02F 2201/465* (2013.01); *G06F 1/1609* (2013.01); *G06F 1/1637* (2013.01); *Y10S 345/905* (2013.01); *Y10T 29/53* (2015.01)

(56) References Cited

U.S. PATENT DOCUMENTS

| | | | |
|---|---|---|---|
| 2010/0177124 A1* | 7/2010 | Ryu et al. | 345/690 |
| 2010/0328927 A1* | 12/2010 | Huang | 362/97.1 |
| 2011/0170034 A1* | 7/2011 | Jeong | 349/61 |

* cited by examiner

POSITIONING DEVICE FOR POSITIONING AN OPTICAL FILM SET, BACKLIGHT MODULE, AND LIQUID CRYSTAL DISPLAY

CROSS-REFERENCE TO RELATED APPLICATION

This application claims priority from and the benefit under 35 U.S.C. §119(a) of Chinese Patent Application No. 201210345843.6, filed on Sep. 18, 2012, which is hereby incorporated by reference for all purposes as if fully set forth herein.

BACKGROUND OF THE INVENTION

1. Field of the Invention

The present invention relates to a thin film transistor liquid crystal display (TFT-LCD), and more particularly, to a positioning device for positioning an optical film set, a backlight module having the positioning device, and a liquid crystal display (LCD) having the positioning device.

2. Description of the Prior Art

Nowadays, TFT-LCDs are a very important display for modern information technology and video products. An optical film set is disposed in the frame of a backlight module and is fixed with rivets or rivet-like objects in some conventional technologies. Specifically, rivets are disposed on a back plate. Openings disposed on the optical film set and corresponding to the rivets can be penetrated by the rivets.

However, inventers of the present invention observe a tendency toward LCDs. Since optical LCDs featuring a thin bezel design become more and more popular, the structure of the conventional backlight module becomes more and more difficult to meet the demand of engineering design.

SUMMARY OF THE INVENTION

An object of the present invention is to provide a positioning device for positioning an optical film set, a backlight module, and an LCD. Owing to the present invention, the positioning of the optical film set is simple. Also, an LCD featuring a thin bezel design is implemented.

According to the present invention, a positioning device for positioning an optical film set in a backlight module is provided. The backlight module comprises a back plate on which the optical film set is disposed. The positioning device comprises:

an assembly sheet, disposed at one end of the positioning device, penetrating an opening formed on at least one edge of the optical film set;

a fixing device, for fixing the positioning device to a side plate of the back plate.

In one aspect of the present invention, the fixing device comprises:

a first sheet, disposed at one end where the assembly sheet is disposed and on a plane where the assembly sheet is disposed;

a second sheet, disposed at another end of the positioning device, and being parallel to the first sheet;

a curved connecting portion, formed between the first sheet and the second sheet;

wherein a hole is formed on the side plate of the back plate, at least a baffle plate is extended outwards from the side plate near least one side of the hole, and a body of the baffle plate and a body of the side plate are in parallel;

the first sheet is stuck to the inner side of the baffle plate, the second sheet is stuck to the outer side of the side plate, and the curved connecting portion penetrates the hole.

In another aspect of the present invention, at least one convex column is disposed on the second sheet, and the convex column fits a through hole or a blind hole which is correspondingly disposed on the side plate of the back plate.

In another aspect of the present invention, the fixing device comprises:

a flexible sheet and a fixing sheet are disposed on the same side of the assembly sheet;

a groove is disposed on the side plate of the back plate;

wherein the flexible sheet leans against the end and outer side of the side plate, and the fixing sheet fittingly penetrates the groove in a direction from the inner side to the out side of the side plate.

In another aspect of the present invention, the fixing sheet is a rectangular sheet or a wedge-shaped sheet.

According to the present invention, a backlight module comprises:

a back plate comprising a base plate and a plurality of side plates, an space being formed between the base plate and the plurality of side plates;

a light guiding plate and an optical film set on the light guiding plate, disposed within the space; and a positioning device for positioning the optical film set, comprising:

an assembly sheet, disposed at one end of the positioning device, penetrating an opening formed on at least one edge of the optical film set; and a fixing device, for fixing the positioning device to a side plate of the back plate.

In one aspect of the present invention, the fixing device comprises:

a first sheet, disposed at one end where the assembly sheet is disposed and on a plane where the assembly sheet is disposed;

a second sheet, disposed at another end of the positioning device, and being parallel to the first sheet;

a curved connecting portion, formed between the first sheet and the second sheet;

wherein a hole is formed on the side plate of the back plate, at least a baffle plate is extended outwards from the side plate near least one side of the hole, and a body of the baffle plate and a body of the side plate are in parallel;

the first sheet is stuck to the inner side of the baffle plate, the second sheet is stuck to the outer side of the side plate, and the curved connecting portion penetrates the hole.

In another aspect of the present invention, at least one convex column is disposed on the second sheet, and the convex column fits a through hole or a blind hole which is correspondingly disposed on the side plate of the back plate.

In another aspect of the present invention, the fixing device comprises:

a flexible sheet and a fixing sheet are disposed on the same side of the assembly sheet;

a groove is disposed on the side plate of the back plate;

wherein the flexible sheet leans against the end and outer side of the side plate, and the fixing sheet fittingly penetrates the groove in a direction from the inner side to the out side of the side plate.

In another aspect of the present invention, the fixing sheet is a rectangular sheet or a wedge-shaped sheet.

In another aspect of the present invention, a liquid crystal display comprising a backlight module as mentioned above is provided.

The positioning device for positioning the optical film set, the backlight module having the positioning device, and the LCD having the positioning device in the present invention have benefits as follows:

Owing to the positioning device, all optical films in the optical film set can be fixed to a side plate of a back plate. The positioning of the optical film set is secured. It is very simple.

And, the use of the positioning device simplifies the structure of the back plate. Since rivets are not used in the present invention, space is saved, which benefits the thin bezel design for the LCD.

BRIEF DESCRIPTION OF THE DRAWINGS

These and other objectives of the present invention will no doubt become obvious to those of ordinary skill in the art after reading the following detailed description of the preferred embodiment that is illustrated in the various figures and drawings.

DETAILED DESCRIPTION OF THE PREFERRED EMBODIMENTS

Figure 1:
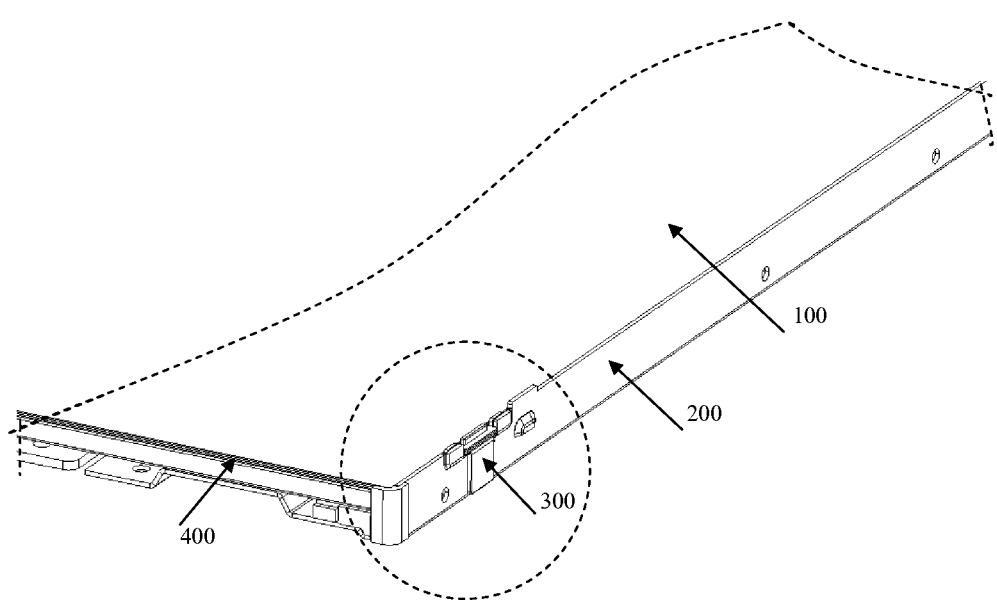
FIG. 1 shows a backlight module according to a preferred embodiment of the present invention.
Figure 2:
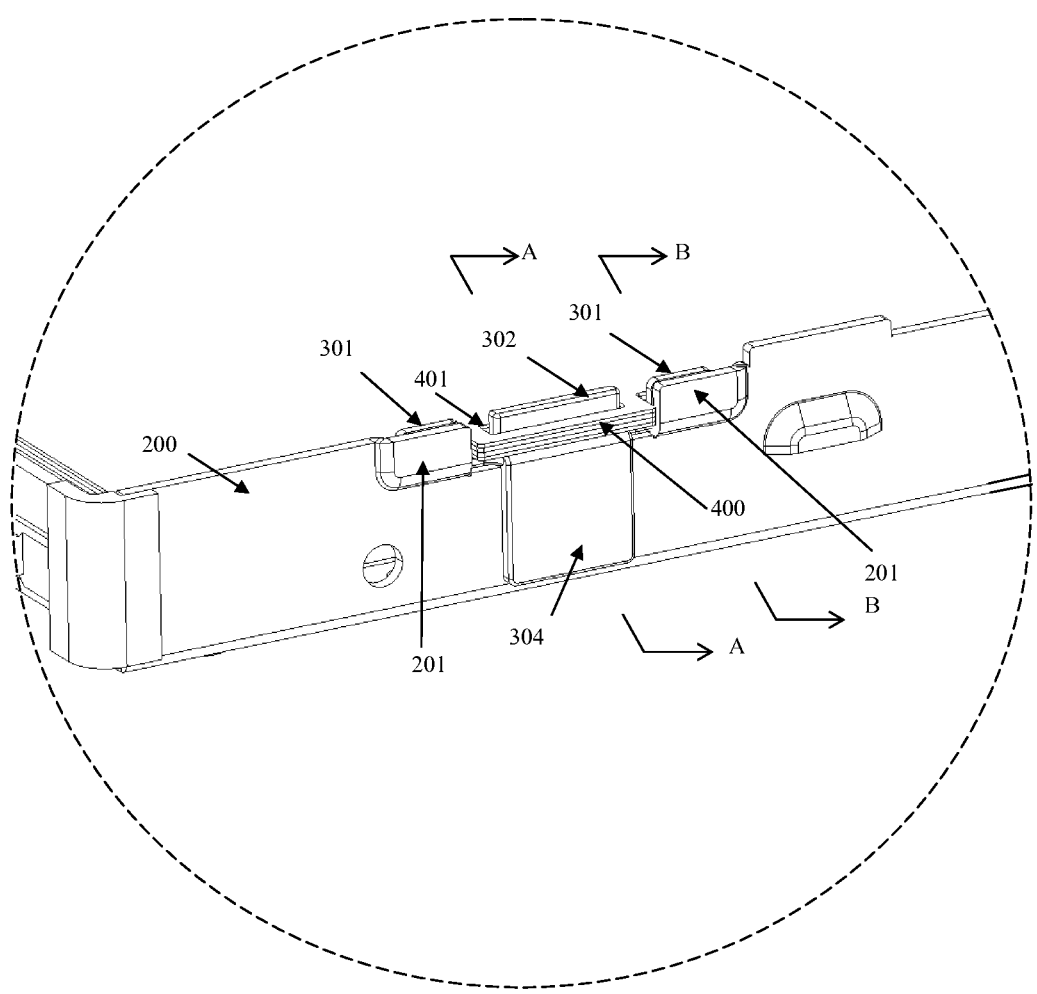
FIG. 2 shows a diagram showing enlarging FIG. 1.
Figure 3:
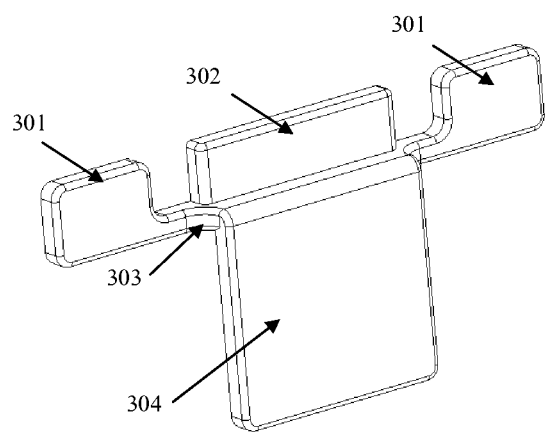
FIG. 3 depicts a positioning device shown in FIG. 2.
Figure 4:
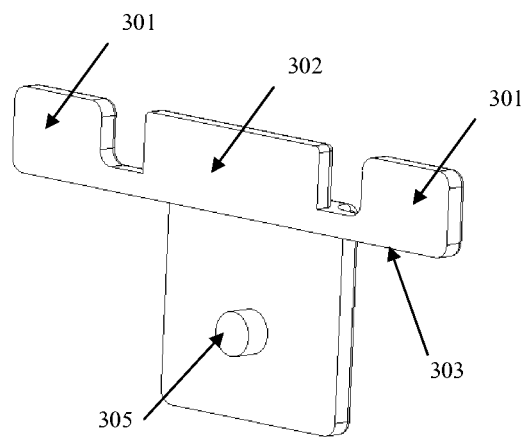
FIG. 4 shows another view of the positioning device shown in FIG. 2.
Figure 5:
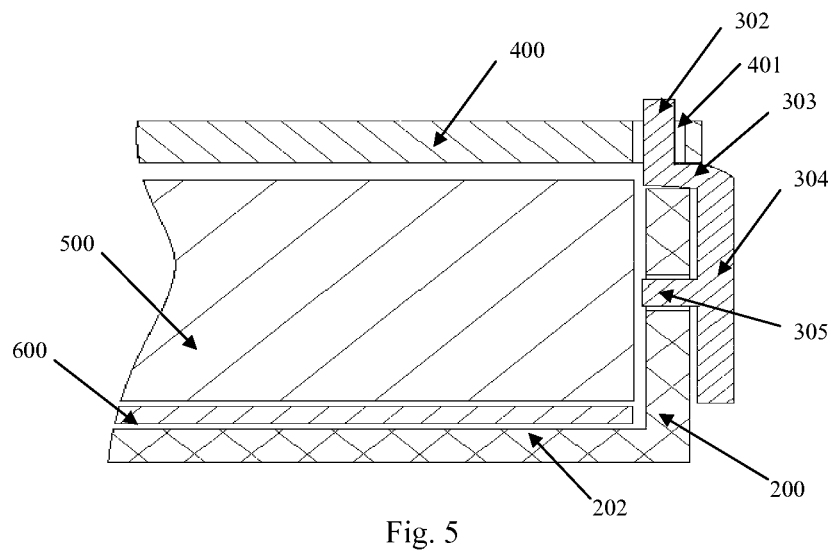
FIG. 5 shows a cross-sectional view along line A-A of FIG. 2.
Figure 6:
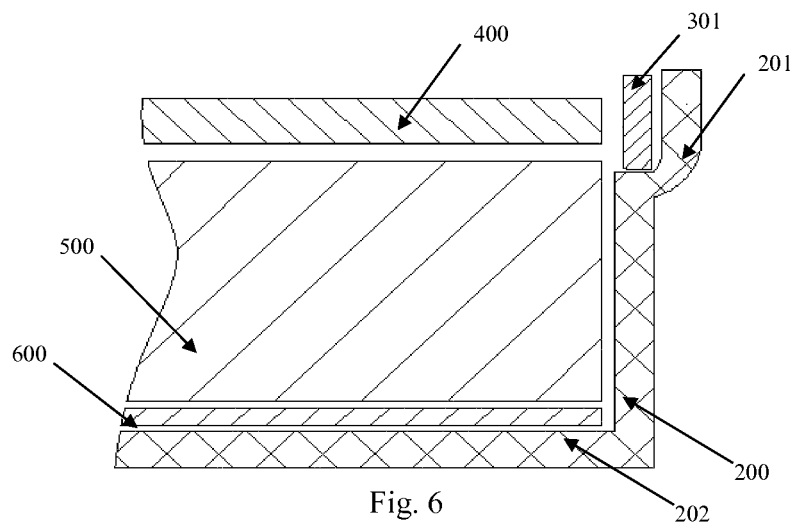
FIG. 6 shows a cross-sectional view along line B-B of FIG. 2.

The features and advantages of the preferred embodiments of the present invention will be more apparent from the following detailed description taken in conjunction with the accompanying drawings.

Refer to FIGS. 1 to 6 showing a positioning device and a backlight module having the positioning device according to one embodiment of the present invention.

The backlight module comprises a back plate.

The back plate comprises at least one base plate 202 and a plurality of side plates 200. A space is formed between the base plate 202 and the plurality of side plates 200.

A reflector sheet 600, a light guide plate (LGP) 500, and an optical film set 400 disposed on the LGP 500 are disposed in the bottom-up order in the space. Specifically, the optical film set 400 comprises a diffuser plate, a prism sheet, etc.

The optical film set 400 is fixed on the back plate by using a positioning device.

Specifically, the positioning device comprises an assembly sheet 302, a first sheet 301, and a second sheet 304.

The assembly sheet 302 is disposed at one side of the positioning device for penetrating an opening 401 formed on at least one edge of the optical film set 400.

The first sheet 301 is disposed at one side where the assembly sheet 302 is disposed and on a plane where the assembly sheet 302 is disposed.

The second sheet 304 is disposed at another side of the positioning device and is parallel to the first sheet 301.

A curved connecting portion 303 is formed between the first sheet 301 and the second sheet 304.

A fixing device is formed by the first sheet 301, the second sheet 304, and the curved connecting portion 303. The positioning device is fixed to the side plates 200 of the back plate using the fixing device.

Further, a hole is formed on each of the plurality of side plates 200. At least a baffle plate 201 is extended outwards from the side plate 200 near least one side of the hole. The baffle plate 201 is a perpendicular baffle plate. The body of the baffle plate 201 and the body of the side plate 200 are in parallel. The baffle plate 201 can be formed using stamping and the like.

The components work together. The first sheet 301 is stuck to the inner side of the baffle plate 201. The second sheet 304 is stuck to the outer side of the side plate 200. The curved connecting portion 303 penetrates the hole. Therefore, the positioning device is firmly fixed to the side plate 200 of the back plate.

In addition, at least one convex column 305 is disposed on the second sheet 304. The convex column 305 fits a through hole or a blind hole correspondingly disposed on the side plate 200. Therefore, the positioning device is more firmly fixed to the side plate 200.

For simplifying the description of the present invention, only one positioning device is exampled in this embodiment. In other words, the present invention is not limited to this embodiment. It is understandable that there are different ways of disposing the positioning device. For example, at least one positioning device as shown in FIGS. 1 to 6 is disposed on each of the plurality of side plates 200. Or, at least one positioning device is disposed on any two opposite side plates 200 while no positioning device is disposed on another two side plates 200. Or, one positioning device is disposed on every three side plates 200. With variation of the disposition of the positioning devices, corresponding locations on the optical film set (i.e., holes disposed on the edge of the optical film set) need to be adjusted.

Figure 7:
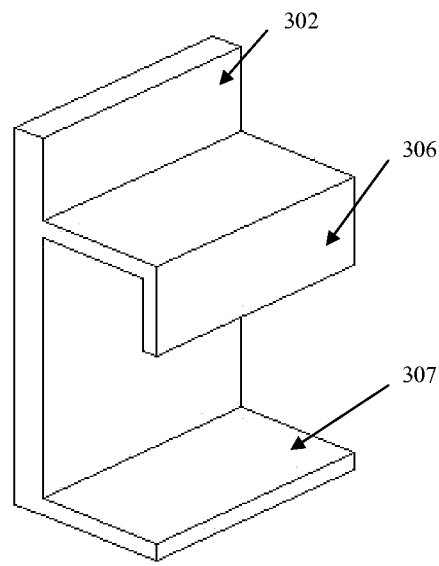
FIG. 7 shows a positioning device according to a second embodiment of the present invention.
Figure 8:
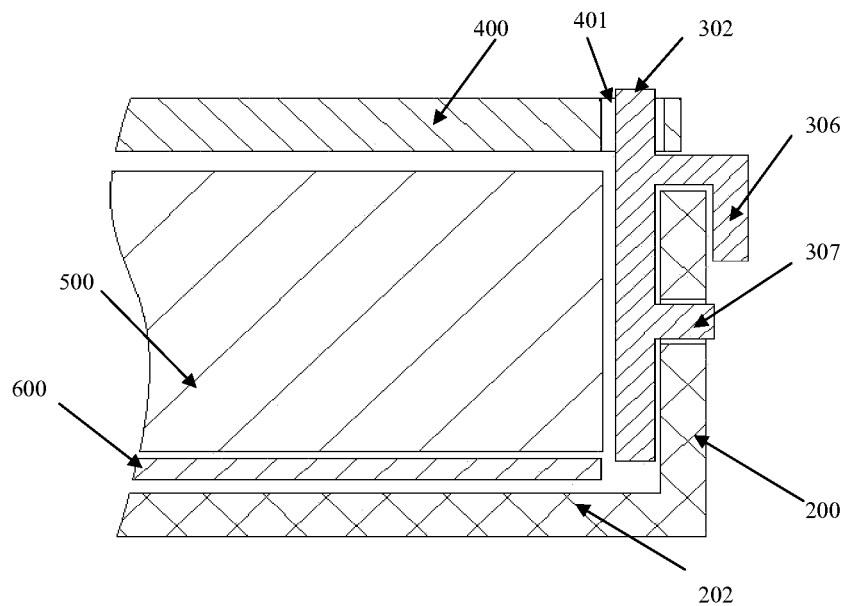
FIG. 8 shows a cross-sectional view illustrating a backlight module using the positioning device shown in FIG. 7.

Refer to FIG. 7 and FIG. 8 showing a positioning device according to another embodiment of the present invention.

The positioning device comprises an assembly sheet 302.

The assembly sheet 302 is disposed at one side of the positioning device and used for penetrating an opening 401 formed on at least one edge of the optical film set 400.

The assembly sheet 302 extends downwards. A flexible sheet 306 and a fixing sheet 307 are disposed on the same side of the assembly sheet 302. The fixing sheet 307 is a rectangular sheet. The flexible sheet 306, the fixing sheet 307, and the extending portion of the assembly sheet 302 form a fixing device. The positioning device is fixed to the side plate 200 using the fixing device.

A groove is disposed on the side plate 200.

When being assembled, the flexible sheet 306 leans against the end and outer side of the side plate 200, and the fixing sheet 307 fittingly penetrates the groove in a direction from the inner side to the out side of the side plate 200. The side plate 200 is stuck into a space formed by the flexible sheet 306 and the fixing sheet 307. Finally, the side plate 200, the flexible sheet 306, and the fixing sheet 307 are stably and firmly fixed with one another.

In this embodiment, the side plate 200 of the back plate in this positioning device does not need to be modified.

Other components as shown in FIG. 8 and their corresponding components as shown in FIGS. 1 to 7 have the structural and functional similarities. So the other components as shown in FIG. 8 will not be described in detail hereafter.

Figure 9:
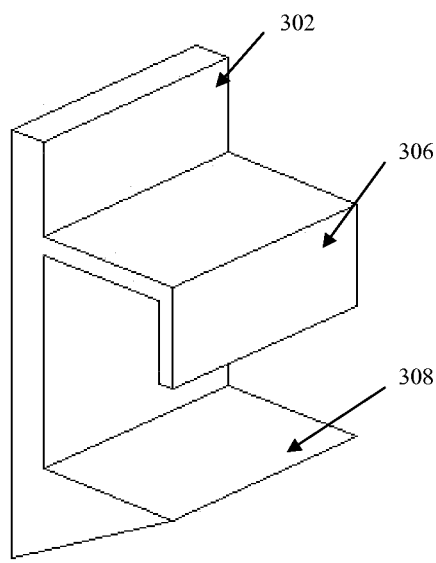
FIG. 9 shows a positioning device according to a third embodiment of the present invention.
Figure 10:
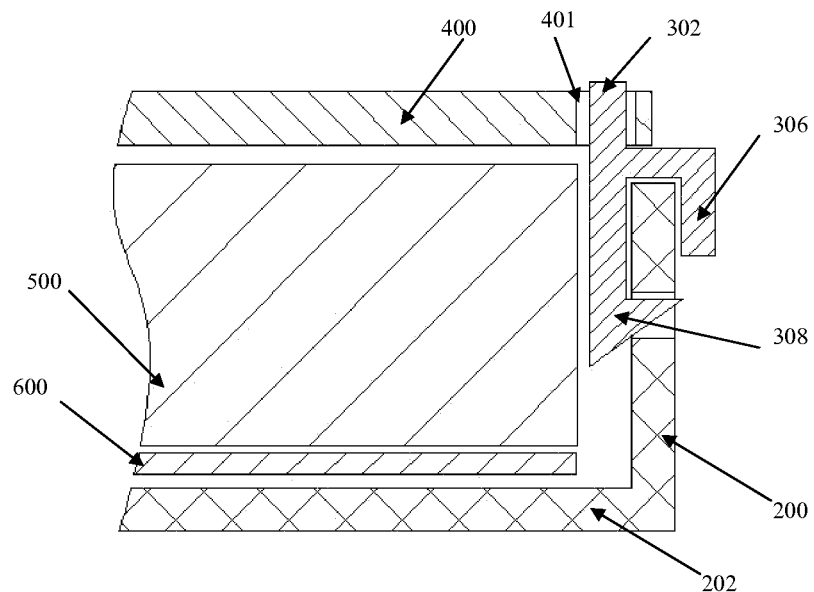
FIG. 10 shows a cross-sectional view illustrating a backlight module using the positioning device shown in FIG. 9.

Refer to FIG. 9 and FIG. 10 showing a positioning device according to a third embodiment of the present invention.

The positioning device as shown in FIGS. 9 and 10 is similar to that as shown in FIG. 7 except that the positioning device in this embodiment comprises a wedge-shaped fixing sheet 308. The method of assembling the wedge-shaped fixing sheet 308 is similar to that as shown in FIG. 8. Please refer to the description for FIG. 8 for better understanding.

Accordingly, a TFT-LCD comprising the backlight module described in the above-mentioned embodiments is provided by the present invention.

In conclusion, the positioning device for positioning the optical film set, the backlight module, and the LCD proposed by the present invention have benefits as follows:

Owing to the positioning device, all of the optical films in the optical film set can be fixed to the side plate of the back plate. So the positioning of the optical film set is secured. It is very simple.

Also, the positioning device of the present invention simplifies the structure of the back plate. Since no rivets are used in the present invention, space is saved, which benefits the thin bezel design for the LCD.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A positioning device for positioning an optical film set in a backlight module, the backlight module comprising a back plate on which the optical film set is disposed, wherein the positioning device comprises:
   an assembly sheet, disposed at one end of the positioning device, penetrating an opening formed on at least one edge of the optical film set; and
   a fixing device, for fixing the positioning device to a side plate of the back plate, the fixing device comprising:
   a flexible sheet and a fixing sheet disposed on the same side of the assembly sheet, the flexible sheet comprising a first plate and a second plate perpendicular to the first plate, the first plate being perpendicular to the assembly sheet and parallel to the fixing sheet; and
   a groove disposed on the side plate of the back plate;
   wherein the flexible sheet leans against an end of the side plate and an outer side of the side plate, and the fixing sheet fittingly penetrates the groove in a direction from an inner side to the outer side of the side plate, and the side plate is stuck into a space formed by the flexible sheet and the fixing sheet.

2. The positioning device as claimed in claim 1, wherein the fixing sheet is a rectangular sheet or a wedge-shaped sheet.

3. A backlight module comprising:
   a back plate comprising a base plate and a plurality of side plates, a space being formed between the base plate and the plurality of side plates;
   a light guiding plate and an optical film set on the light guiding plate, disposed within the space; and
   a positioning device for positioning the optical film set, comprising:
   an assembly sheet, disposed at one end of the positioning device, penetrating an opening formed on at least one edge of the optical film set; and
   a fixing device, for fixing the positioning device to a side plate of the back plate, the fixing device comprising:
   a flexible sheet and a fixing sheet disposed on the same side of the assembly sheet, the flexible sheet comprising a first plate and a second plate perpendicular to the first plate, the first plate being perpendicular to the assembly sheet and parallel to the fixing sheet; and
   a groove disposed on the side plate of the back plate;
   wherein the flexible sheet leans against an end of the side plate and an outer side of the side plate, and the fixing sheet fittingly penetrates the groove in a direction from an inner side to the outer side of the side plate, and the side plate is stuck into a space formed by the flexible sheet and the fixing sheet.

4. The backlight module as claimed in claim 3, wherein the fixing sheet is a rectangular sheet or a wedge-shaped sheet.

5. A liquid crystal display comprising a backlight module, the backlight module comprising:
   a back plate comprising a base plate and a plurality of side plates, a space being formed between the base plate and the plurality of side plates;
   a light guiding plate and an optical film set on the light guiding plate, disposed within the space; and
   a positioning device for positioning the optical film set, comprising:
   an assembly sheet, disposed at one end of the positioning device, penetrating an opening formed on at least one edge of the optical film set; and
   a fixing device, for fixing the positioning device to a side plate of the back plate, the fixing-device comprising:
   a flexible sheet and a fixing sheet disposed on the same side of the assembly sheet, the flexible sheet comprising a first plate and a second plate perpendicular to the first plate, the first plate being perpendicular to the assembly sheet and parallel to the fixing sheet; and
   a groove disposed on the side plate of the back plate;
   wherein the flexible sheet leans against an end of the side plate and an outer side of the side plate, and the fixing sheet fittingly penetrates the groove in a direction from an inner side to the outer side of the side plate, and the side plate is stuck into a space formed by the flexible sheet and the fixing sheet.

6. The liquid crystal display as claimed in claim 5, wherein the fixing sheet is a rectangular sheet or a wedge-shaped sheet.

* * * * *